June 23, 1942.  W. C. DILLON  2,287,299
DYNAMOMETER
Filed June 24, 1939  2 Sheets-Sheet 2
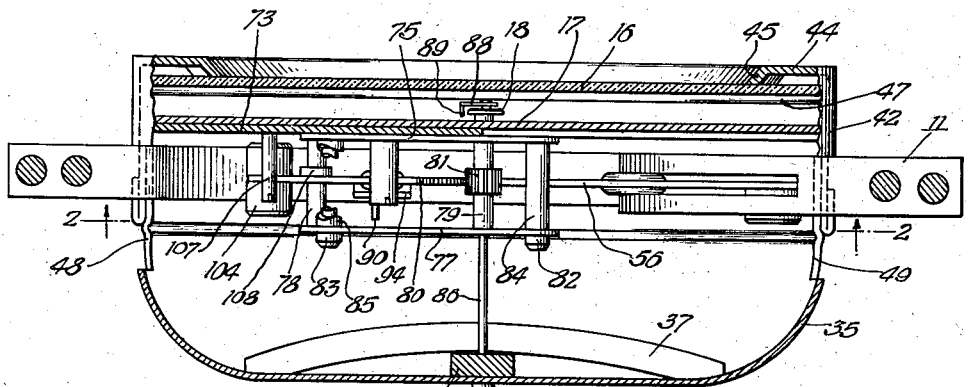
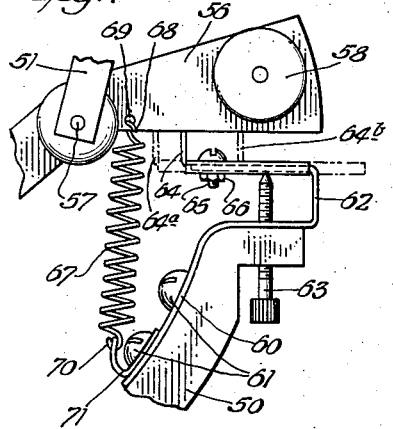
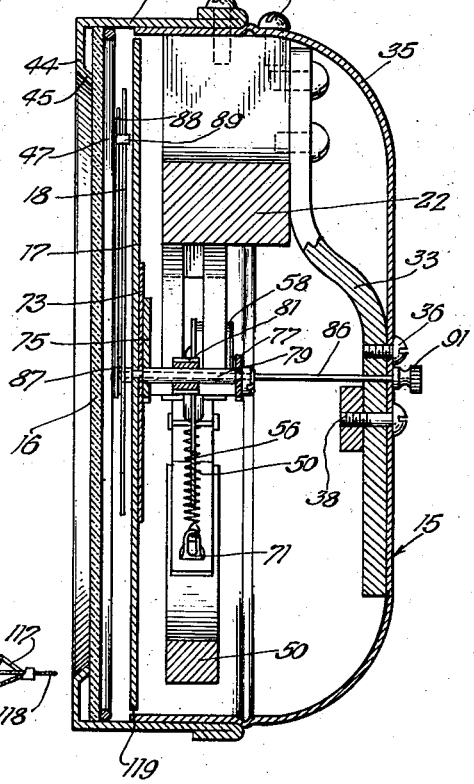
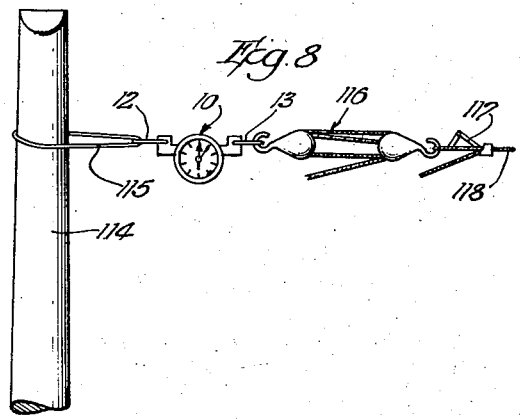
Inventor:
William C. Dillon
By: Sheridan, Ross & Cargill
Attys.

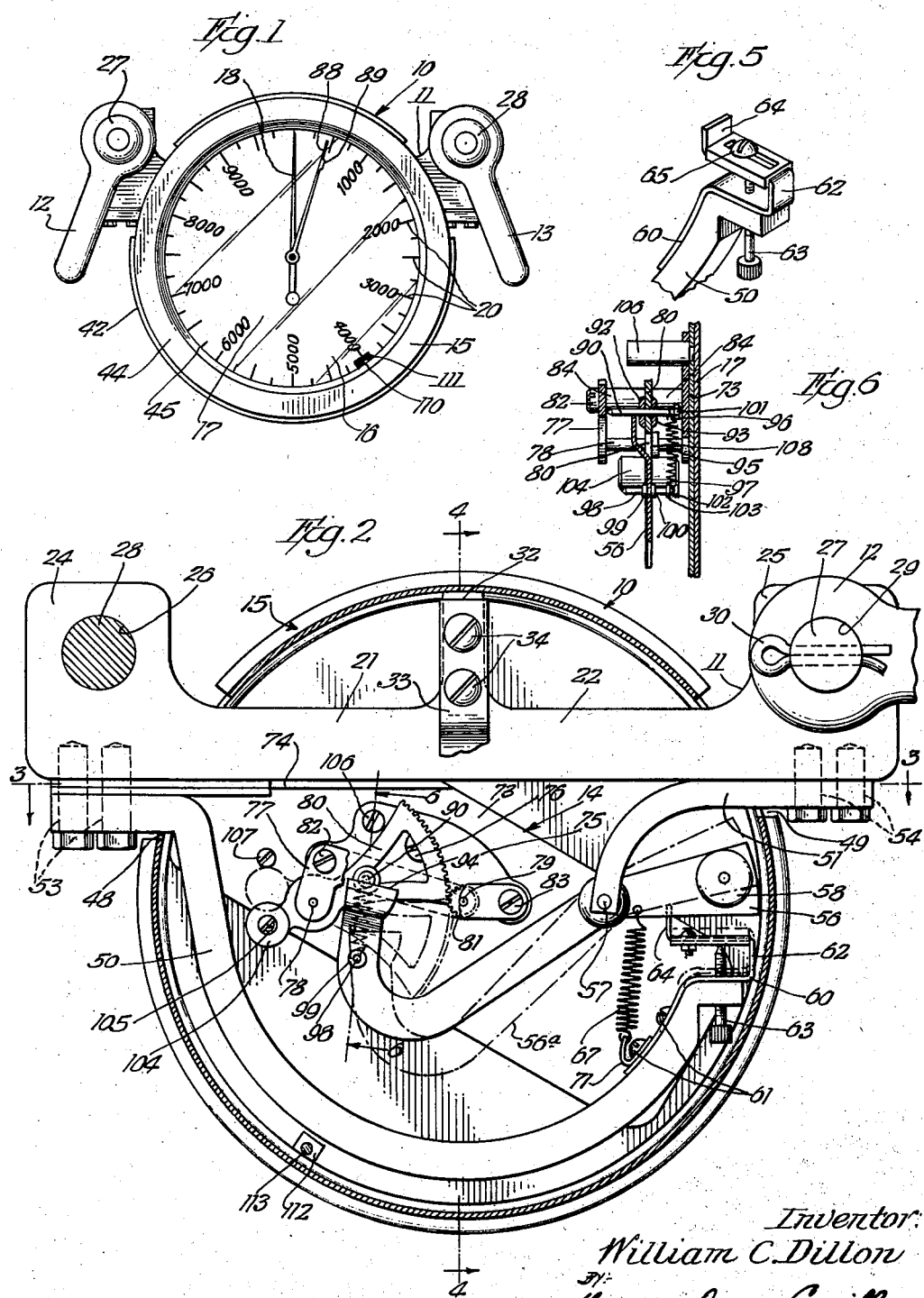

Patented June 23, 1942

2,287,299

UNITED STATES PATENT OFFICE 2,287,299

DYNAMOMETER

William C. Dillon, Chicago, Ill., assignor to W. C. Dillon & Company, Inc., Chicago, Ill., a corporation of Illinois Application June 24, 1939, Serial No. 280,957

6 Claims. (Cl. 265—68)

My invention relates to dynamometers, and more particularly to the type of dynamometers utilized in measuring exerted forces.

An object of my invention is to provide a compact, direct reading, portable dynamometer which is adapted to be utilized for measuring exerted forces.

Another object of my invention is to provide a dynamometer for measuring tensile forces which is accurate and small and which can be manufactured at a reasonable price.

Another object of my invention is to provide a dynamometer for measuring exerted forces, the measuring range of which may be changed without replacing any of the parts thereof.

Another object of my invention is to provide a dynamometer for measuring exerted force which may be easily and quickly installed for making measurements.

Another object of my invention is to provide a dynamometer for measuring exerted force which is not damaged or rendered inaccurate by overloading, even to a considerable degree.

Another object of my invention is to provide a dynamometer for measuring exerted force which is adjustable for initially setting and for resetting the instrument in accurate calibration.

Another object of my invention is to provide a dynamometer for measuring exerted force which has a direct reading dial scale and co-operating pointer and which has a mechanism providing smooth and substantially instantaneous operation of the pointer in response to exerted forces.

Another object of my invention is to provide a traction dynamometer which is not damaged or rendered inaccurate by recoil upon release of the traction force exerted thereon.

Other objects of the invention relate to features of construction and arrangement of parts which will be apparent from a consideration of the following specification and accompanying drawings, wherein:

Figure 1 is a front elevation of a preferred embodiment of my invention;

Figure 2 is a rear, sectional view showing the operating parts of a device embodying a preferred form of my invention with the section taken substantially on a line 2—2 of Figure 3 and in the direction of the arrows;

Figure 3 is a sectional view with the section taken substantially on a line 3—3 of Figure 2 and looking in the direction of the arrows;

Figure 4 is a sectional view with the section taken substantially on a line 4—4 of Figure 2 and looking in the direction of the arrows;

Figure 5 is a fragmentary perspective view illustrating a detail of a part of a preferred form of my invention;

Figure 6 is a fragmentary sectional view with the section taken substantially on a line 6—6 of Figure 2 and looking in the direction of the arrows;

Figure 7 is a fragmentary elevation of a portion of the operating parts embodied in a preferred form of my invention; and Figure 8 is an elevation illustrating the utility and one use for which the device shown in Figure 1 is particularly adapted.

Having particular reference to the drawings, the dynamometer 10 which, in this instance, is particularly adapted to the measurement of tensile or traction forces but which might well be adapted to the measurement of forces such as compression forces, has a flexible bar 11 to and through which the measured forces are applied through links 12 and 13. An indicating mechanism 14 which is actuated by the flexure of the bar 11, is enclosed within a housing 15, which housing includes a window 16 through which a scale 17 and a co-operating pointer 18 are visible. Where particular precision is desired, the individual dynamometer is preferably calibrated after assembly and the calibration is marked on the scale 17, as indicated at 20. A reasonable degree of accuracy may, however, be obtained with the dynamometer herein disclosed by carefully making the parts thereof and making certain adjustments of the parts which will be more fully described, to effect calibration of the instrument with a standard pre-marked scale.

The bar 11 has intermediate portions 21 and 22 which are of substantially the same cross-sectional dimensions and the dimensions of which are dependent upon the range of force which the dynamometer is designed to measure. At the ends, the bar 11 has angularly disposed portions 24 and 25 extending outwardly on the same side of the bar. The angularly extending portions 24 and 25 have openings therethrough, such as 26, through which pins 27 and 28 extend for rotatably securing the links 12 and 13 to the bar. The openings, such as 26, are perpendicular to the longitudinal axis of the portions 21 and 22 and substantially equi-distant from said axis. The links 12 and 13 are preferably substantially U-shaped and have side openings, such as 29, through which the pins 27 and 28 extend; the pins being secured in position by cotter pins, such as 30, or other suitable means. Since force is applied to the bar 11 through the links 12 and 13 and the pins 27 and 28, and since the pins 27 and 28 are displaced from the longitudinal axis of the portions 21 and 22 of the bar, the force thus applied tends to flex or bend the intermediate portion of the bar, including portions 21 and 22. The distances between the axes of the pins 27 and 28 and the longitudinal axis of the bar determine the movement of leverage of the bending force upon the mid-portion of the bar. The dimensions of the mid-portion of the bar, the material or metal of which the bar is made, and the distances between the axes of the pins 27 and 28 and the longitudinal axis of the bar are so selected that the bar is flexed by forces within a range to be utilized in a particular dynamometer and also so that the bar is not broken by the forces or stressed beyond the elastic limit. The portions 21 and 22 of the bar and the side of the bar opposite the angularly projecting portions 24 and 25 are preferably substantially straight when the bar is unstressed. Also, the angularly disposed portions 24 and 25 are sufficiently wide, as viewed in Figure 2, in comparison with the cross-sectional dimensions of the portions 21 and 22, so that these angularly disposed portions do not flex appreciably or independently of the flexure of the mid-portion of the bar, including the portions 21 and 22.

A lug 32 is preferably integral with the mid-portion of the bar 11 and projects from one side thereof to provide a mounting for a bracket 33, to which the housing 15 is secured. The bracket 33 is secured to the lug 32 by screws, such as 34, which extend therethrough and are threaded into the lug 32. The housing preferably comprises a cup-shaped back portion 35 which is secured to the bracket 33 by a screw 36 which extends therethrough and is threaded into the bracket 33. A cross-piece 37 is secured to the bracket 33 by a screw 38 and engages the cup-shaped portion 35 of the housing to provide additional support therefor. Also, the screw 40 extends through the cup-shaped portion 35 of the housing and is threaded into the lug 32 to additionally secure the cup-shaped portion in position. The lug 32 is comparatively thin or narrow in a direction parallel to the longitudinal axis of the bar so that it does not appreciably affect the flexure of the mid-portion of the bar.

A bezel 42 provides the front portion of the housing 15 and telescopically engages the rim of the cup-shaped portion 35. The bezel 42 is secured in position by a screw 43 which extends therethrough and through the cup-shaped portion 35, and is threaded into the lug 32. The bezel has a flange 44 which is integral therewith and which has an inturned edge 45 against which the glass or window 16 is held in position by a ring 47. The bezel 42 and cup-shaped portion 35 of the housing have slots cut therein at 48 and 49 which provide openings through which the ends of the bar 11 extend.

In the operating mechanism which provides a visual and calibrated indication of the deflection of the bar 11 responsive to applied force, substantially rigid, curved arms 50 and 51 are secured to spaced parts of the bar, preferably near the ends thereof and opposite the angularly projecting portions 24 and 25. These arms 50 and 51 are secured to the bar by screws, such as 53 and 54, respectively, or other suitable fastening means. The arms 50 and 51 are preferably of unequal length and extend to positions such that their ends are near each other. The arms are also preferably in a plane with the bar, or substantially parallel to the axis of the bar in one direction. A lever 56 is rotatably supported at one end of the bar 51 by a pin 57 which is secured to the bar 51. The lever 56 is rotatable in a plane passing through the bar 11 and the arms 50 and 51, the lever 56 being longer on one side of the pin 57 than on the other. A counterweight 58 is secured to the shorter end of the lever to substantially balance the lever about the pin 57.

A bracket 60 is secured to the free end of the arm 50 by screws 61, or other suitable means, and has a substantially U-shaped end portion 62. An adjusting screw 63 is threaded through the end of the arm 51 and extends through one side of the U-shaped portion 62. The other side of the U-shaped portion 62 is biased toward the end of the adjusting screw 63, and the adjusting screw 63 abuts the said other side of the U-shaped portion 62 to determine the position of that side. A second bracket 64 is secured to the adjustable side of the U-shaped portion 62 of the bracket 60 by a bolt 65 and a co-operating nut 66 or other suitable means. The bracket 64 is preferably slotted so that it is adjustable to positions such as those indicated by dotted lines at 64a and 64b. The bracket 64 engages the lever 56 to provide a fulcrum for determining the position of the lever. The lever 56 is biased into engagement with the bracket 64 by a spring 67 which has a hook portion 68 extending through an aperture 69 in the lever 56 and a hook portion 70 extending through an opening in a lug 71, which is anchored to the arm 50 by one of the screws 61.

In the preferred embodiment of my invention which is disclosed herein, the arms 50 and 51 are of unequal length and are secured to similar and oppositely flexed spaced portions of the bar 11, so that relative movement occurs between the ends of the arms by virtue of their unequal length. It is realized and understood that relative movement can be obtained between the ends of arms such as 50 and 51, but of equal length, by securing the arms to spaced portions of the bars that are differently affected by flexure of the bar. The system disclosed in which arms of unequal length are utilized is considered preferable in some respects.

A support plate 73 has an integral flange 74 thereon which is secured to the bar 11 between the anchored end of the arm 50 and the bar. An auxiliary support plate 75 is secured to the support plate 73 by screws such as 76 or other suitable means. A second auxiliary support plate 77, together with the auxiliary support plate 75 provide bearings for rotatably supporting shafts 78 and 79 to which a rack 80 and a pinion 81 are respectively secured. The second auxiliary support plate 77 is secured to the support plate 73 by screws 82 and 83, and is spaced from the support plate and auxiliary support plate, 73 and 75, by collars, such as 84 and 85. The pointer 18 is secured to the end of the shaft 79 adjacent the front of the scale 17 by a collar 87 that is pressed on the end of the shaft 79. When desired, a pusher indicator or auxiliary pointer 88 is rotatably supported concentrically with respect to the shaft 79 and has a lug 89 thereon which engages one side of the pointer 18, so that it is moved by the pointer 18 in one direction and stays at the point of the highest reading reached by the hand 18 until it is manually reset to the zero position by rotation of a shaft 86 and control knob 91.

A pin 90 extends through the rack 80 and is secured thereto by collars 92 and 93 which are pressed onto the pin 90 and which engage the sides of the rack 80. On one side of the rack 80 the pin 90 engages a camming surface 94 on the end of the lever 56, which camming surface is preferably flat. On the other side of the rack 80 the pin 90 has a spring or resilient member 95 connected thereto by a hooked portion 96 on the spring. The other end of the spring 95 is connected by hooked portion 97 to one end of a pin 98 which extends through the lever 56 and is secured thereto by collars 99 and 100. A head 101 on the end of the pin 90 and a head 102 on the end of the pin 98, together with a collar 103 on the pin 98, determine the position of the spring 95 on the pins. This spring 95 biases the pin 90 into engagement with the camming surface 94 on the lever 56 and maintains such engagement during normal movement of the lever 56, responsive to relative movement of the arms 50 and 51. Since the rack 80 is thereby actuated responsive to movement of the lever 56 and the rack 80 engages the pinion 81, the pointer 18 is moved by the movements of the lever 56. The rack 80 has a counterweight 104 secured thereto by a screw 105 to substantially balance the rack for rotary movement about the axis of the shaft 78. Movement of the rack 80 in one direction is stopped by a stop comprising a stud 106 which is threaded into the support plate 73. Movement of the rack in the other direction is limited by a stop comprising a stud 107 which is threaded into the support plate 73 in position to engage the counterweight 104. The limits of movement for the rack prevent disengagement of the rack 80 from the pinion 81. The position of the rack 80 on the shaft 78 is determined by a collar 108 which is secured to the shaft 78.

In some instances, and where desired, one or more resilient contacts, such as 110, are secured to the edge of the scale 17 and insulated therefrom by insulating members 111. The contacts are preferably clipped on to the edge of the scale and are adjustable to a desired and predetermined position on the periphery of the scale, in which position they are adapted to be engaged by the pointer 18 to complete an electrical circuit, and thereby give a signal when the predetermined point on the scale is reached by the pointer. Connections to the contacts are made through wires connected to terminals such as 112 and secured thereto by screws such as 113.

In the design of the dynamometer disclosed, it is preferable that the axes of the shafts 78 and 79 and of the pin 57 are substantially in alignment and substantially equi-distant from the surface of the bar 11. It is also preferable that the normal position of the fulcrum 64 is nearly in alignment with the line passing through the axes of the shafts 78 and 79 and the pin 57. It is also preferable that the axis of the pin 90 is located between the line passing through the axes of the shafts 78 and 79 and the surface of the bar 11.

One possible use or adaptation of the dynamometer is disclosed in Fig. 8. Having particular reference to this figure, the dynamometer 10 is secured to a pole 114 by a cable 115 that extends around the pole and through the link. The other end of the dynamometer is connected through a block and tackle 116 and a suitable clamp 117 to a guy wire or cable 118, so that the tension on the guy wire or cable may be measured as the block and tackle is operated to increase the tension on the cable.

In the operation of the dynamometer, the force applied to the bar 11 through the links 12 and 13 effects a bowing or curving flexure of the bar by virtue of the leverage of the angularly projecting portions 24 and 25. As the bar 11 flexes or bows, the angular positions of the arms 50 and 51 are changed, and relative movement occurs between the ends of the arms 50 and 51. Since the lever 56 is supported by the end of the arm 51 and the fulcrum 64 is supported by the end of the arm 50, this relative movement between the ends moves the lever to a position such as that indicated at 56a in Fig. 2. The pin 90, being biased into engagement with the cam surface 94 of the lever 56, the movement of the lever effects a corresponding movement of the rack 80, and, consequently, movement of the pinion 81. Some multiplication of the movement is effected as a result of the difference in the length of the lever arms, between the fulcrum 64 and the pin 57, and between the pin 57 and the point of engagement of the pin 90 with the cam surface 94. Further multiplication of the movement is accomplished as a result of the leverage in the rack itself, and also as a result of the ratio of the rack gear to the pinion gear. The resulting gain in mechanical movement provides a large deflection of the pointer 18 for a very small flexure of the bar 11.

By anchoring the support plate 73 between the anchored end of the arm 50 and the bar 11, the flexure of the bar moves the shaft 79 in nearly the same direction and by nearly the same amount as the movement of the case or housing 15 which is anchored to the lug 32 on the bar. For the deflections obtained, the difference in movement or relative movement between the shaft 79 and housing 15 is insufficient to be detrimental. However, since the scale 17 is carried by the support plate 73, the edges of the scale are separated from the case or housing 15, as indicated at 119 in Fig. 4, to insure against any binding or undesirable results due to slight relative movement between the case or housing 15 and the scale 17. Since the limits of movement of the rack 80 are established by the stops 106 and 107, and since the lever 56 moves away from the pin 90 during the application of force to the dynamometer, any excessive force which would tend to move the rack 80 out of engagement with the pinion 81 is prevented from doing any damage to the operating parts of the dynamometer by the stretching of the spring or resilient element 95. Damage to the dynamometer due to a sudden release of the force, which might cause recoil or reverse flexure of the bar 11, is prevented by stretching of the spring or resilient element 67 which permits separation of the fulcrum 64 from the lever 56. It is a feature of the operation of the dynamometer that while the springs or resilient elements 95 and 67 provide the protection against damage to the operating parts of the dynamometer and link the parts together, their tension remains substantially constant throughout the normal operating range of the instrument.

In the original adjustment of the dynamometer or for resetting the dynamometer in calibration, the adjusting screw 63 is manually adjusted to determine the position of the fulcrum 64 and, consequently, zero position of the lever 56. It is another feature of the dynamometer disclosed that with a particular bar 11, the measurable range of forces may be changed by moving the position of the fulcrum 64 along the lever 56, as illustrated in Fig. 7.

While I have shown and described a specific embodiment of my invention for the purpose of illustration, it will be apparent that changes may be made therein without departing from the spirit of the invention.

What I claim as new and desire to cover by Letters Patent is:

1. A dynamometer comprising, in combination, means adapted to flex in response to applied force, substantially rigid relatively movable members having relative positions determined by flexure of said means, and indicating means controlled by the relative positions of said movable members, said indicating means including a rack and pinion and a lever for actuating the rack in response to relative movement of said members, means including resilient members connecting said lever to said rack and to one of said movable members, stops for limiting the movement of said rack, said springs preventing damage to said rack and pinion upon overload and said stops preventing disengagement of the rack and pinion.

2. A dynamometer comprising, in combination, a single bar having a portion of predetermined cross section adapted to flex in response to applied force and angularly projecting portions of greater cross section to which the force is applied, members having relative positions controlled by flexure of said portion of predetermined cross section, and indicating means controlled by the relative positions of said members, said indicating means including a rotatably mounted lever actuated by said members and a rack and pinion mounted for rotation responsive to rotary movement of the lever, the axes of rotation of said lever, rack and pinion normally being approximately in a straight line and equidistant from the bar.

3. A dynamometer comprising, in combination, a bar adapted to flex in response to applied force and having a normally straight side, members having relative positions controlled by flexure of said bar, and indicating means controlled by the relative positions of said members, said indicating means including a plurality of co-operating rotatably mounted parts, and a fulcrum on one of said members engaging one of said parts to control the position thereof, the fulcrum and the axes of rotation of said parts being substantially in a straight line which is practically parallel to said straight side in the normal position of the first mentioned means.

4. In a dynamometer, the combination comprising a member adapted to flex in response to applied force, indicating means including movable parts and a scale, a housing including a window enclosing said movable parts and scale, said housing being secured to said member near the mid-portion thereof, said movable parts and said scale being supported from said member by means secured to said member at a position spaced from the mid-portion of the member, and said scale being spaced from the housing.

5. A dynamometer comprising, in combination, a bar having a normally linear flexible portion adapted to flex in response to applied force, relatively rigid movable members having relative positions determined by flexure of the bar, and indicating means controlled by the relative positions of said movable members, said indicating means including a relatively rigid lever rotatably supported by one of said movable members and an intermediate indicator driving instrumentality, a resilient member biasing the lever toward the other of said movable members, and a resilient member biasing the intermediate driving instrumentality into engagement with the lever.

6. In a dynamometer, the combination comprising a single flexible metallic bar having a normally straight mid-portion and end portions extending angularly outwardly from the same side of the ends of the bar, means for applying force to the end portion in a line offset from the mid-portion, the end portions being short with respect to the length of the mid-portion and the section of the end portions being large with respect to the section of the mid-portion by proportions such that applied force on said end portions effects curvature of the normally straight mid-portion which is proportional to the force applied, a relatively rigid member secured at one of its ends to one of said end portions and having its free end positioned closely adjacent the other end portion of said bar, and indicator means responsive to relative movement between said free end of the member and said other end portion of the bar.

WILLIAM C. DILLON.